United States Patent
Dowty et al.

(10) Patent No.: US 7,134,729 B2
(45) Date of Patent: Nov. 14, 2006

(54) FRAME ASSEMBLY FOR VEHICLE PASSENGER SEAT

(75) Inventors: Mark Brian Dowty, Rural Hall, NC (US); Tracy Neal Pence, Winston-Salem, NC (US); Trevor B. Skelly, Winston-Salem, NC (US); James Randy Penley, Pfafftown, NC (US); Joachim Gustav Voight, Nidderau (DE); Glenn A. Johnson, King, NC (US)

(73) Assignee: BE Aerospace, Inc., Wellington, FL (US)

( * ) Notice: Subject to any disclaimer, the term of this patent is extended or adjusted under 35 U.S.C. 154(b) by 17 days.

(21) Appl. No.: 10/979,680

(22) Filed: Nov. 2, 2004

(65) Prior Publication Data

US 2005/0253436 A1 Nov. 17, 2005

Related U.S. Application Data

(60) Provisional application No. 60/529,686, filed on Dec. 15, 2003, provisional application No. 60/589,297, filed on Jul. 20, 2004.

(51) Int. Cl.
*A47C 7/02* (2006.01)
*B60N 2/02* (2006.01)
*B64D 11/06* (2006.01)

(52) U.S. Cl. .......................... 297/452.18; 297/452.19; 297/343; 297/353

(58) Field of Classification Search ................ 297/452.18–452.2, 317–318, 320, 353, 452.29, 297/452.39, 248, 341, 343, 452.25, 284.11, 297/232, 452.36, 452.14, 188.1, 216.2
See application file for complete search history.

(56) References Cited

U.S. PATENT DOCUMENTS

| 3,833,257 | A | 9/1974 | Dove |
| 4,018,166 | A | 4/1977 | Gutridge et al. |
| 4,756,034 | A | 7/1988 | Stewart |
| 5,507,555 | A | 4/1996 | Kiguchi |
| 5,560,681 | A | 10/1996 | Dixon et al. |

(Continued)

FOREIGN PATENT DOCUMENTS

EP    0869061 A3    11/1999

(Continued)

*Primary Examiner*—Peter M. Cuomo
*Assistant Examiner*—Tania Abraham
(74) *Attorney, Agent, or Firm*—Adams Evans P.A.

(57) ABSTRACT

A frame assembly for vehicle passenger seat, including at least one leg unit, including a cantilevered transverse main beam carried by a fore and aft-extending seat leg for being mounted to the floor of the vehicle, a transversely extending front beam positioned forward of the seat leg, a backshell attached to and carried by the transverse main beam, a seat back carried on the backshell, and a seat bottom carried by a perimeter frame mounted on the backshell.

22 Claims, 15 Drawing Sheets

U.S. PATENT DOCUMENTS

| | | | |
|---|---|---|---|
| 5,810,446 A * | 9/1998 | Tadokoro | 297/452.18 |
| 5,857,745 A | 1/1999 | Matsumiya | |
| 5,954,401 A | 9/1999 | Koch et al. | |
| 5,988,757 A * | 11/1999 | Vishey et al. | 297/452.31 |
| 5,992,798 A | 11/1999 | Ferry | |
| 6,059,364 A | 5/2000 | Dryburgh et al. | |
| 6,119,980 A | 9/2000 | Ferry | |
| 6,276,635 B1 | 8/2001 | Ferry et al. | |
| 6,305,644 B1 | 10/2001 | Beroth | |
| 6,412,870 B1 | 7/2002 | Higgins et al. | |
| 6,494,536 B1 | 12/2002 | Plant | |
| 6,669,143 B1 * | 12/2003 | Johnson | 244/122 R |
| 6,692,069 B1 | 2/2004 | Beroth et al. | |
| 6,695,406 B1 * | 2/2004 | Plant | 297/423.26 |
| 6,742,840 B1 * | 6/2004 | Bentley | 297/316 |
| 6,769,739 B1 | 8/2004 | Salzer et al. | |
| 6,824,213 B1 * | 11/2004 | Skelly et al. | 297/217.3 |
| 2003/0075962 A1 | 4/2003 | Saltzer et al. | |
| 2003/0085597 A1 | 5/2003 | Ludeke et al. | |

FOREIGN PATENT DOCUMENTS

| | | |
|---|---|---|
| EP | 1043225 A2 | 10/2000 |
| EP | 1044878 A2 | 10/2000 |
| EP | 1097864 A1 | 5/2001 |
| GB | 2295962 A | 6/1996 |
| GB | 2331237 A | 5/1999 |
| JP | 3-1837 | 1/1991 |
| WO | WO 01/32506 A1 | 10/2000 |

* cited by examiner

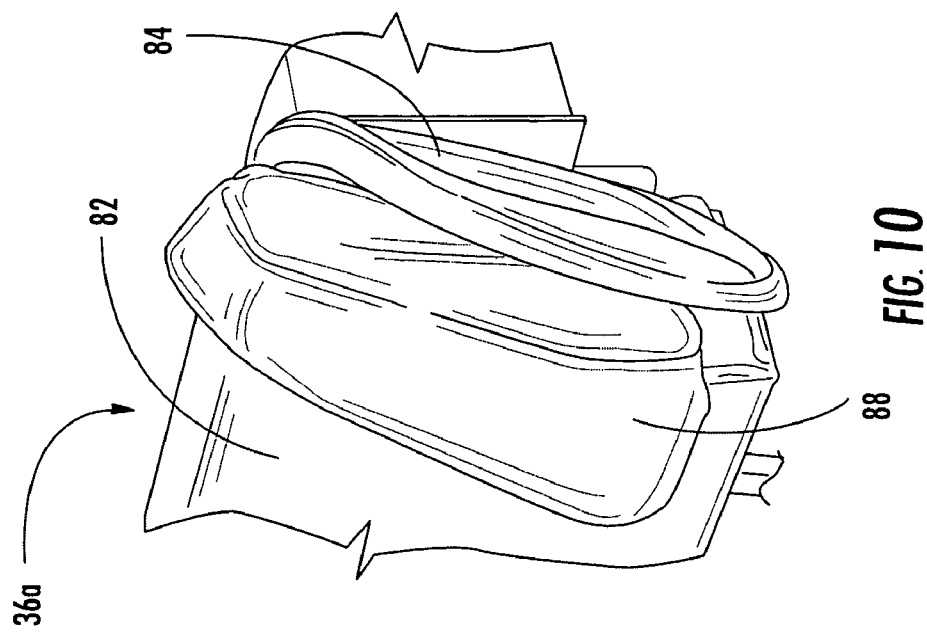
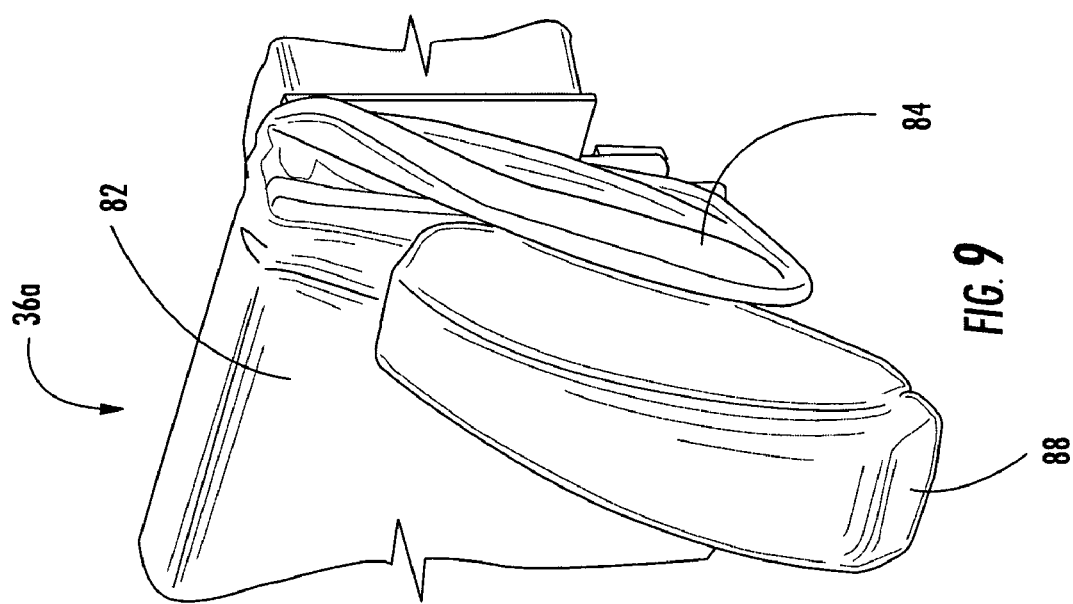

FRAME ASSEMBLY FOR VEHICLE PASSENGER SEAT

CROSS-REFERENCE TO RELATED APPLICATIONS

This application claims the benefit of U.S. Provisional Application No. 60/529,686 filed Dec. 15, 2003, and Provisional Application No. 60/589,297, filed Jul. 20, 2004.

TECHNICAL FIELD AND BACKGROUND OF THE INVENTION

This invention relates to seating and more particularly to a seat frame assembly for a tourist/coach class aircraft seating arrangement. Aircraft seating is typically divided into various classes, for example first class, business class, and coach or tourist class. For each class of seating, an individual passenger is allotted a preselected amount of space (both area and volume). First-class seats provide the most individual space, and also may include features to improve comfort, such as fully reclining sleeper functions. In contrast, the tourist/coach class is provided with a relatively small amount of space, in order to provide the most efficient transportation and lowest cost. For example, the longitudinal space or "pitch" of the seat rows may be as little as 71 cm (28 in.) However, this space limitation in combination with the seat design can create a very ineffective environment for either working (e.g.: on a lap top computer) or sleeping/stretching (lack of comfort). This lack of effectiveness can result in passenger frustration. In addition, passengers sitting in a row directly forward of another passenger can "recline" their seat into the "living space" of the passenger behind, resulting in a lack of harmony between passengers and a phenomenon known as "air rage". The lack of passenger effectiveness and harmony between rows of passengers results in economy class travel being frequently considered as a "bad experience". Modern aircraft are increasingly capable of longer flight segments, thus, the ability to create a more effective environment within economy class travel, allowing passengers to adopt multiple postures such as sleep and creating better harmony between passengers during long flights is increasingly important.

To alleviate discomfort, it is advantageous for a passenger to be able to sit or lie in various positions during a flight as desired without undue encroachment on the space of adjacent passengers. Overall, with longer flight segments, passengers find it necessary to adopt an increasing number of postures and undertake an increasing number of activities. Such activities include but are not limited to, sitting upright, reclining, watching a movie, working on a lap top computer, stretching or slouching, sleeping, and "perching". Unfortunately, conventional coach class seats do not readily accommodate positions other than simple sitting in the upright or reclined positions, and the amount of recline is limited by the above-mentioned seat pitch.

Accordingly, it is an object of the invention to provide a passenger seating arrangement including a frame assembly that takes advantage of space under and aft of the passenger seat that provides a greater degree of comfort and adjustment that in previous passenger seats, while maintaining each passenger within the area and volume assigned to the particular seat.

It is another object of the invention to provide a frame assembly for a passenger seat that includes a stationary back that does not encroach on an aft-seated passenger;

It is another object of the invention to provide a frame assembly for a passenger seat that includes a stationary back that does not encroach on an aft-seated passenger while permitting a relatively wide range of motion to the seated passenger;

It is another object of the invention to provide a frame assembly for a passenger seat that includes a backshell that permits a limited amount of rocking motion while not encroach on an aft-seated passenger

BRIEF SUMMARY OF THE INVENTION

These and other objects are met by the present invention, which in one embodiment provides a passenger seat a frame assembly for vehicle passenger seat, comprising at least one leg unit, including a cantilevered transverse main beam carried by a fore and aft-extending seat leg for being mounted to the floor of the vehicle. A transversely extending front beam is positioned forward of the seat leg, and a backshell is attached to and carried by the transverse main beam. A seat back is carried on the backshell, and a seat bottom carried by a perimeter frame mounted on the backshell.

According to one preferred embodiment of the invention, the front beam comprises a hollow box beam extending substantially from floor level to a position adjacent the seat bottom.

According to another preferred embodiment of the invention, the perimeter frame comprises a back frame and a bottom frame carried by the backshell.

According to yet another preferred embodiment of the invention, the bottom frame is covered by a flexible seat pan and a padded seat cushion.

According to yet another preferred embodiment of the invention, the box beam is adapted to contain electrical and electronic seat components.

According to yet another preferred embodiment of the invention, the frame assembly comprises two laterally spaced-apart leg units, and the cantilevered transverse main beam connects and maintains the two leg units in a fixed relationship with each other.

According to yet another preferred embodiment of the invention, the frame assembly comprises a transversely extending front beam positioned forward of the seat leg, and at least first and second side-by-side backshells attached to and carried by the transverse main beam. First and second perimeter frames are carried by respective backshells. First and second seat bottoms are carried by respective perimeter frames.

According to yet another preferred embodiment of the invention, the backshell comprises contoured clearance areas to provide room for the knees of an aft-seated passenger.

According to yet another preferred embodiment of the invention, the backshell comprises a rigid material fixed to the transverse main beam for maintaining a stationary position during movement of the seat back and seat bottom to a plurality of comfort positions in order not to encroach on space occupied by an aft-seated passenger.

According to yet another preferred embodiment of the invention, the backshell comprises a plurality of generally planar facets angled to collectively define a shape adapted for serving as a seat back.

According to yet another preferred embodiment of the invention, the seat back is mounted for movement relative to the backshell between upright and reclined positions.

According to yet another preferred embodiment of the invention, the backshell is mounted for a limited, passenger-initiated back-and-forth rocking motion.

According to yet another preferred embodiment of the invention, the perimeter frame is mounted on the backshell for fore and aft sliding motion.

According to yet another preferred embodiment of the invention, a frame assembly is provided for a vehicle passenger seat, and comprises at least one leg unit, including a cantilevered transverse main beam carried by a fore and aft-extending seat leg for being mounted to the floor of the vehicle. A transversely extending front beam is positioned forward of the seat leg. The front beam comprises a hollow, transversely-extending box beam with a backshell attached to and carried by the transverse main beam. A seat back is carried on the backshell, and a seat bottom is carried by a perimeter frame comprising a back frame and a bottom frame carried by the backshell. The bottom frame is covered by a flexible seat pan and a padded seat cushion.

According to yet another preferred embodiment of the invention, the box beam is adapted to contain electrical and electronic seat components, and the frame assembly includes two laterally spaced-apart leg units. The cantilevered transverse main beam connects and maintains the two leg units in a fixed relationship with each other.

According to yet another preferred embodiment of the invention, the backshell comprises contoured clearance areas to provide room for the knees of an aft-seated passenger.

According to yet another preferred embodiment of the invention, the backshell comprises a rigid material fixed to the transverse main beam for maintaining a stationary position during movement of the seat back and seat bottom to a plurality of comfort positions in order not to encroach on space occupied by an aft-seated passenger.

According to yet another preferred embodiment of the invention, the backshell comprises a plurality of generally planar facets angled to collectively define a shape adapted for serving as a seat back.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 9 is a perspective view of a headrest;

FIG. 10 is another perspective view of a headrest;

DESCRIPTION OF THE PREFERRED EMBODIMENT AND BEST MODE

Figure 1A:
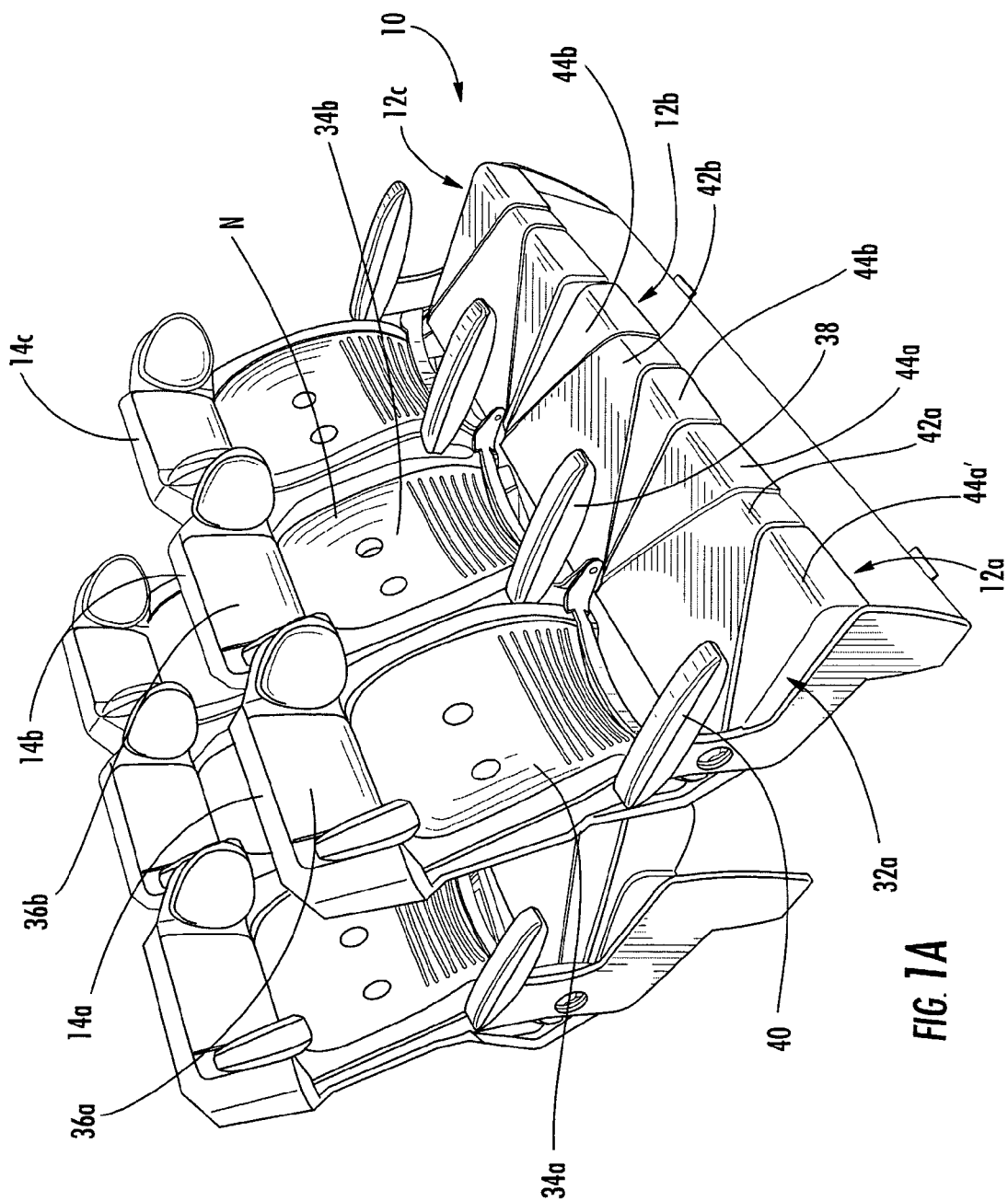
FIG. 1A is a perspective view of a passenger seat set constructed in accordance wit the present invention, disposed in an upright sitting position.

Referring now specifically to the drawings, a passenger seat set including seats according to the present invention is illustrated in FIG. 1 and shown generally at reference numeral 10. In the illustrated example, the seat set 10 includes three seats 12a, 12b, and 12c, which are supported by rigid backshells 14a, 14b, and 14c, respectively, each of which includes a stationary video screen 13 and a folding tray table 15. In contrast to prior art seats, the backshells 14a, 14b, and 14c are contoured with sculpted clearance areas 16 and 17 to provide room for the knees of an aft-seated passenger. The seats 12 could alternatively be arranged as single units or in side-by-side units of any number of adjacent seats. The backshells 14a, 14b, and 14c are attached to and supported by a cantilevered transverse main beam 18. The main beam 18 is depicted here as an "I" section member, but the shape is not critical and may be varied. For example, a hollow cross-section (not shown) may be used. The main beam 18 is attached to leg units 20 and 22 that are in turn mounted to the floor of the vehicle. Each leg unit 20 and 22 includes a longitudinal bottom member 24, a vertical upright member 26, and a longitudinal top member 28, which may all be part of a single unitary component. The leg units 20 and 22 are tied together by a transverse front beam 30, which may be a hollow box-section member suitable for containing electronics or other seat-related equipment (not shown). The main beam 18 and the leg units 20 and 22 cooperatively define a seat frame.

The seats 12a, 12b, and 12c are substantially identical to each other, accordingly any part of the following description specifically referring to one of the seats 12a, 12b, or 12c, or to the components thereof, may be taken to apply to the other seats as well. The seat 12a includes a seat bottom 32a, a seat back 34a, and a headrest 36a. Armrests 38 and 40 are positioned on opposite sides of the seat 12a. One or more of the armrests 38 and 40 may be shared with the adjacent seat 12b in the seat set 10. The armrests 38 and 40 are moved forward from the backshell 14a so that no gap is required between adjacent backshells 14. The seat bottom 32a includes a central portion 42a and at least one support wing 44a. In the illustrated example, a pair of support wings 44a and 44a' are pivotally attached to the central portion 42a at angled hinge lines.

The seat 12a allows a passenger seated therein to reconfigure the seat 12a to achieve a number of different sitting postures while ensuring that the living space of the individual passengers are mutually protected from each other. In each of these configurations, no part of the seat 12a extends beyond the backshell 14a or the backshell of the seat which is positioned directly in front of the seat 12a. In contrast to prior art seats, these protected living space postures are possible even though the seat rows are mounted with a very small longitudinal spacing or pitch, denoted "P". The pitch P is set according to the wishes of the individual aircraft operator. In the illustrated example, the pitch P will be in the accepted range for "coach class" seats which have not heretofore had the capability of providing multiple postures with fixed living space. This range for the pitch "P" is about 79 cm (31 in.) to about 92 cm (36 in.), and more typically about 81 cm (32 in.) to about 86 cm (34 in.) The seats 12 may also be spaced at an even smaller pitch by limiting their motion somewhat, for example about 71 cm (28 in.) For comparison, it is noted that the accepted pitch between prior art business-class seats is substantially larger, for example about 140 cm (55 in.) or greater. The seat 12*a* may be reconfigured by various means. For example, the moving components of the seat 12*a* may be connected to actuators which operate in response to commands from individual switches or a control unit. Alternatively, individual manual controls may be provided for the various seat components.

Figure 1B:
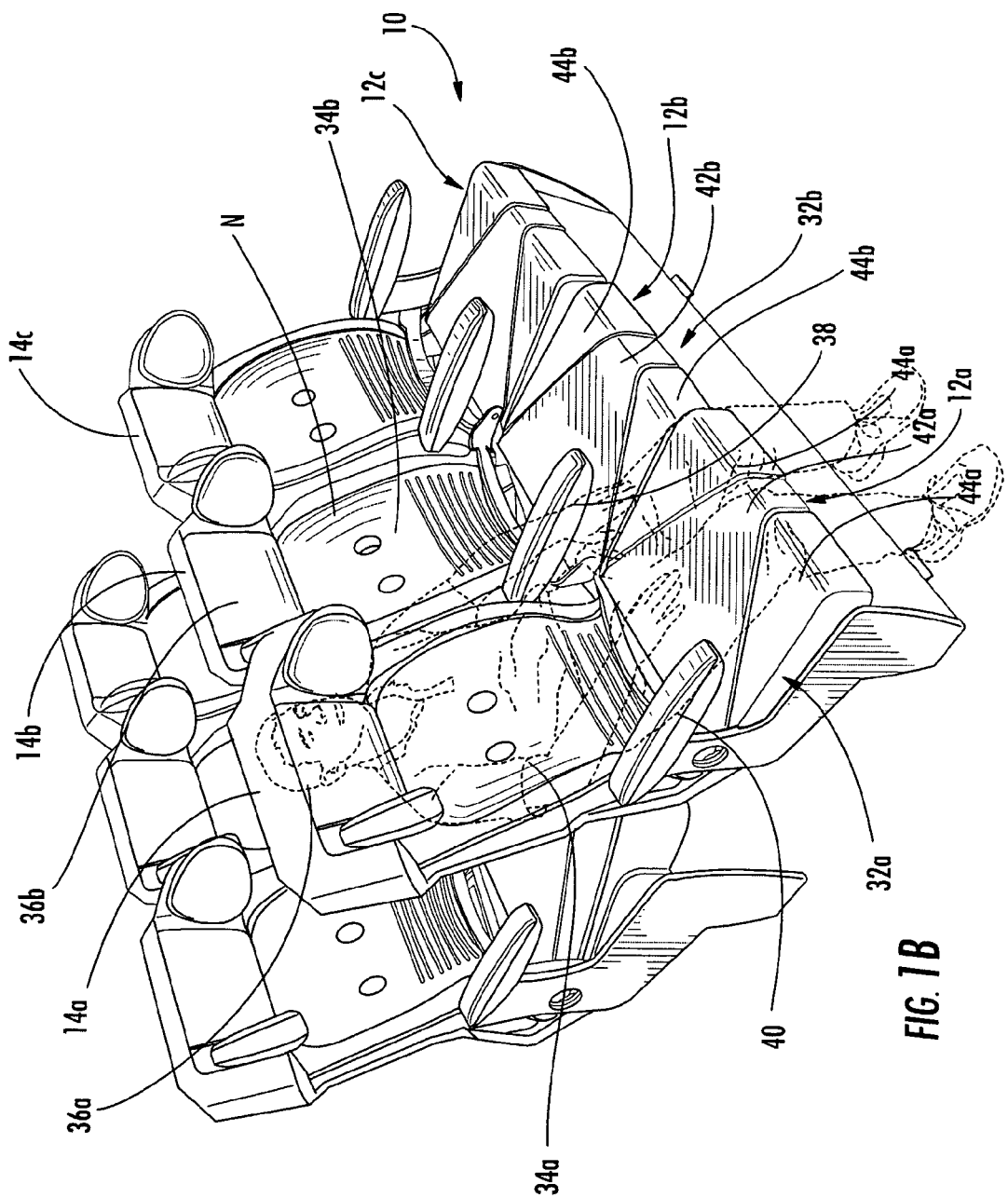
FIG. 1B is a perspective view of the passenger seat set of FIG. 1, with one of seats disposed in a reclined position.

FIG. 1A shows the seat 12*a* configured for a regular sitting posture. In this configuration, the seat bottom 32*a* is at its most rearward location, the seat back 34*a* is at its most upright position against the backshell 14*a*, and the headrest 36*a* is at its highest position. The passenger is comfortably supported in the regular sitting posture by the cushioning of the headrest 36*a* and the seat bottom 32*a*, and the flexing action of the seat back 34*a*, described in more detail below. The seat bottom 32*a* may be equipped with a "waterfall" feature, described in more detail below, which allows the effective front-to-rear length of the seat bottom 32*a* to be selectively reduced for increased passenger comfort. Because the backshell 14*a* of the passenger's seat 12*a* and those of all the surrounding seats are rigid and do not move, the passenger's individual allotted space is protected from intrusion of the other passengers. FIG. 1B shows the seat 12*a* configured for a "reclined" posture. The seat bottom 32*a* is translated forward relative to the backshell 14*a*. The clearance areas 16 and 17 of the backshell 14*a* and the forward-positioned armrests of the seat positioned ahead of seat 12*a* accommodate the passenger's knees and thus allow the passenger in the seat 12*a* to move farther forward than would otherwise be possible.

The bottom end of the seat back 34*a* is pulled forward along with the seat bottom 32*a*, and the upper end of the seat back 34*a* moves down the surface of the backshell 14*a*, in a manner discussed in more detail below. The seat back 34*a* thus moves forward while tilting backwards into a reclined position. The head rest 36*a* may also be lowered, either manually or automatically in unison with the motion of the seat back 34*a*, so that the head rest 36*a* maintains a constant relative height compared to the upper end of the seat back 34*a*. Throughout the recline motion, the seat back 34*a* is restrained by the backshell 14*a* and does not move aft, thus it does not intrude into the space of a passenger seated behind seat 12*a*.

This recline position is achieved without the need to lower the passenger's center of gravity. Thus, no special equipment is needed to lift the passenger, unlike prior art designs which lower the passenger's center of gravity, and thus have to generate a "return" force sufficient to lift the weight of the heaviest anticipated passenger, in order to return to the upright position.

Figure 1C:
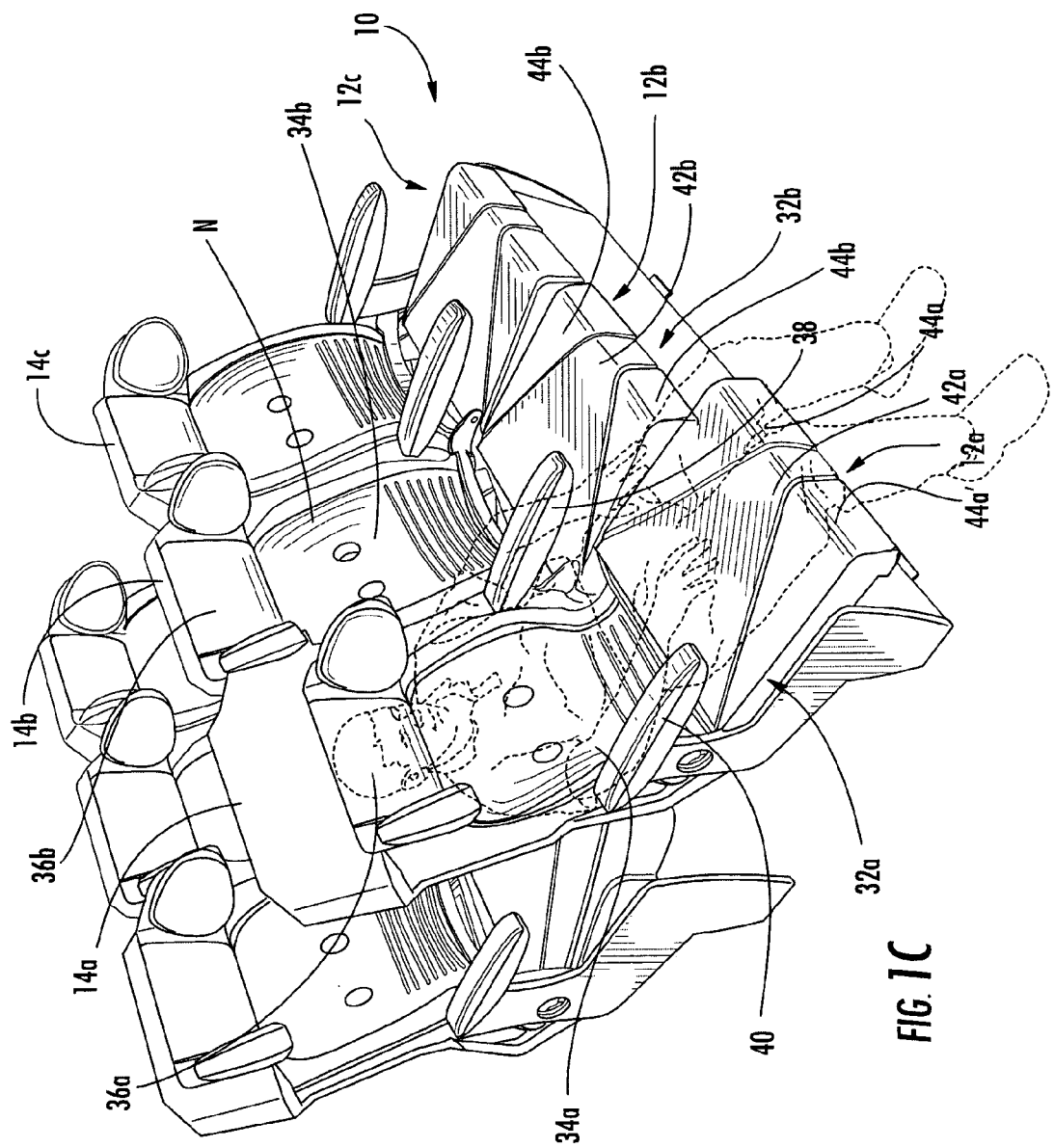
FIG. 1C is a perspective view of the passenger seat set of FIG. 1, with one of seats disposed in a "slouching" position.

FIG. 1C shows the seat 12*a* configured for a "slouch" or "slump" posture. The seat bottom 32*a* is translated yet further forward relative to the backshell 14*a* as compared to the "reclined" position. The bottom end of the seat back 34*a* is pulled farther forward along with the seat bottom 32*a*, and the upper end of the seat back 34*a* moves further down the surface of the backshell 14*a*. The front edge of the seat bottom 32*a* is lowered. This configuration allows the passenger to stretch out his or her body and legs, and makes it easier for the passenger to place his or her feet beneath the seat bottom of the seat mounted forward of the seat 12*a*.

Figure 1D:
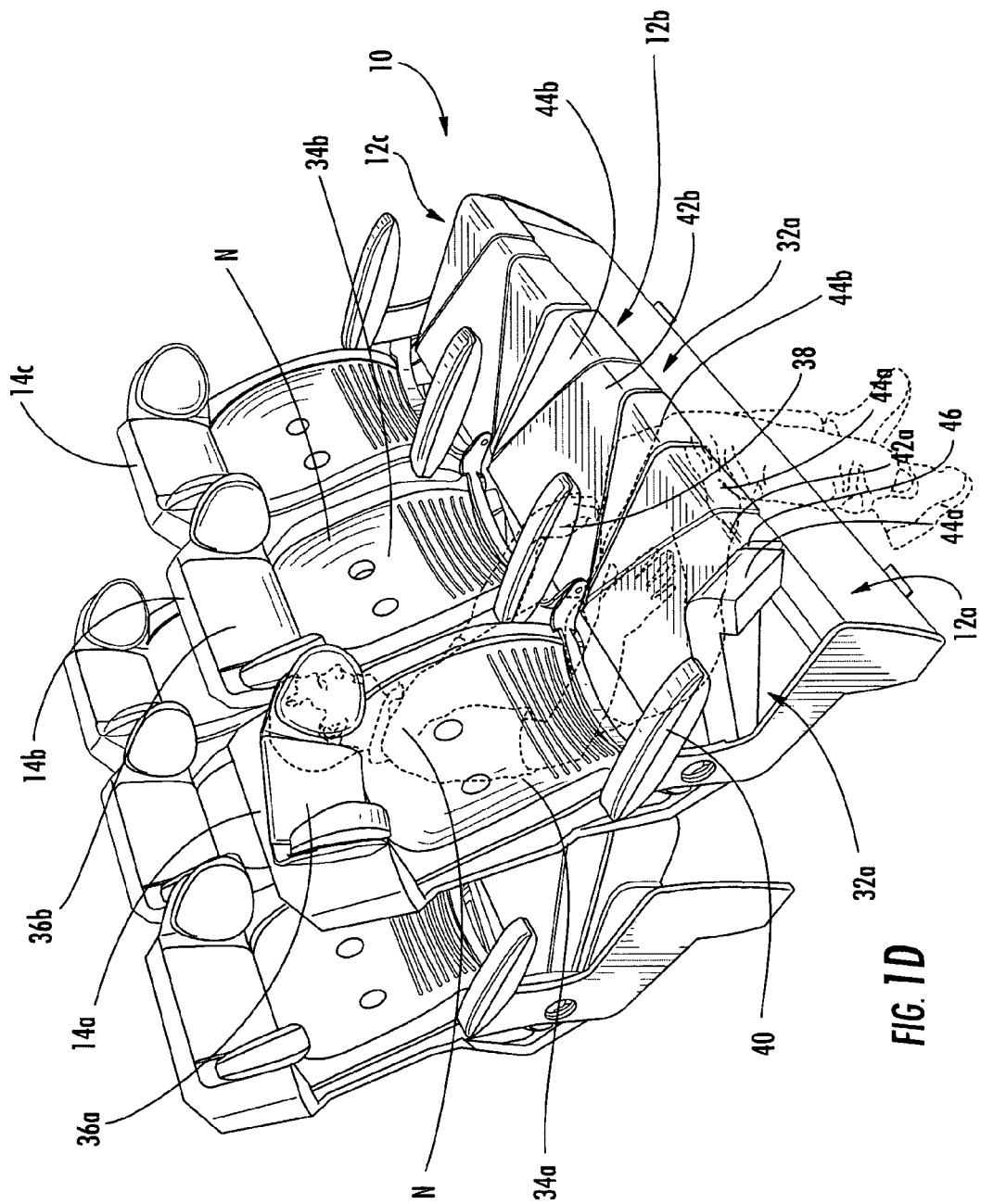
FIG. 1D is a perspective view of the passenger seat set of FIG. 1, with one of seats disposed in a "side sleep" position.

FIG. 1D shows the seat 12*a* configured for a "side sleep" or "fetal" posture. In this configuration, the seat bottom 32*a* is translated forward and its front edge is lowered, and the seat back 34*a* is pivoted back as for the "slouch" posture. The seat back 34*a* is rotated about a line essentially parallel to the passenger's spine, thus creating a shoulder niche "N". One of the support wings 44*a* of the seat bottom 32*a* is pivoted upward along the hinge line 46, depending on the direction the passenger wishes to turn. The head rest 36*b* about a generally longitudinal axis, causing the side of the headrest 36*a* towards the direction of the passenger's roll to be lowered towards the shoulder niche N. This position allows the passenger to stretch out vertically, creates a suitable shoulder resting area and headrest, supports the passenger's hips in the rotated position, and prevents the passenger from slipping down off of the seat 12*a*. The passenger may thus remain in the sleeping position without requiring any muscular activity. It is noted that the support wings 44 need not be hinged. Any structure with allows a portion of the seat bottom 32*a* to effectively lift upward to support the passenger's in a rotated position may be used. For example, the hinged support wings 44*a* may be replaced with cushions which can be selectively inflated to create an effectively raised support wing.

Figure 1E:
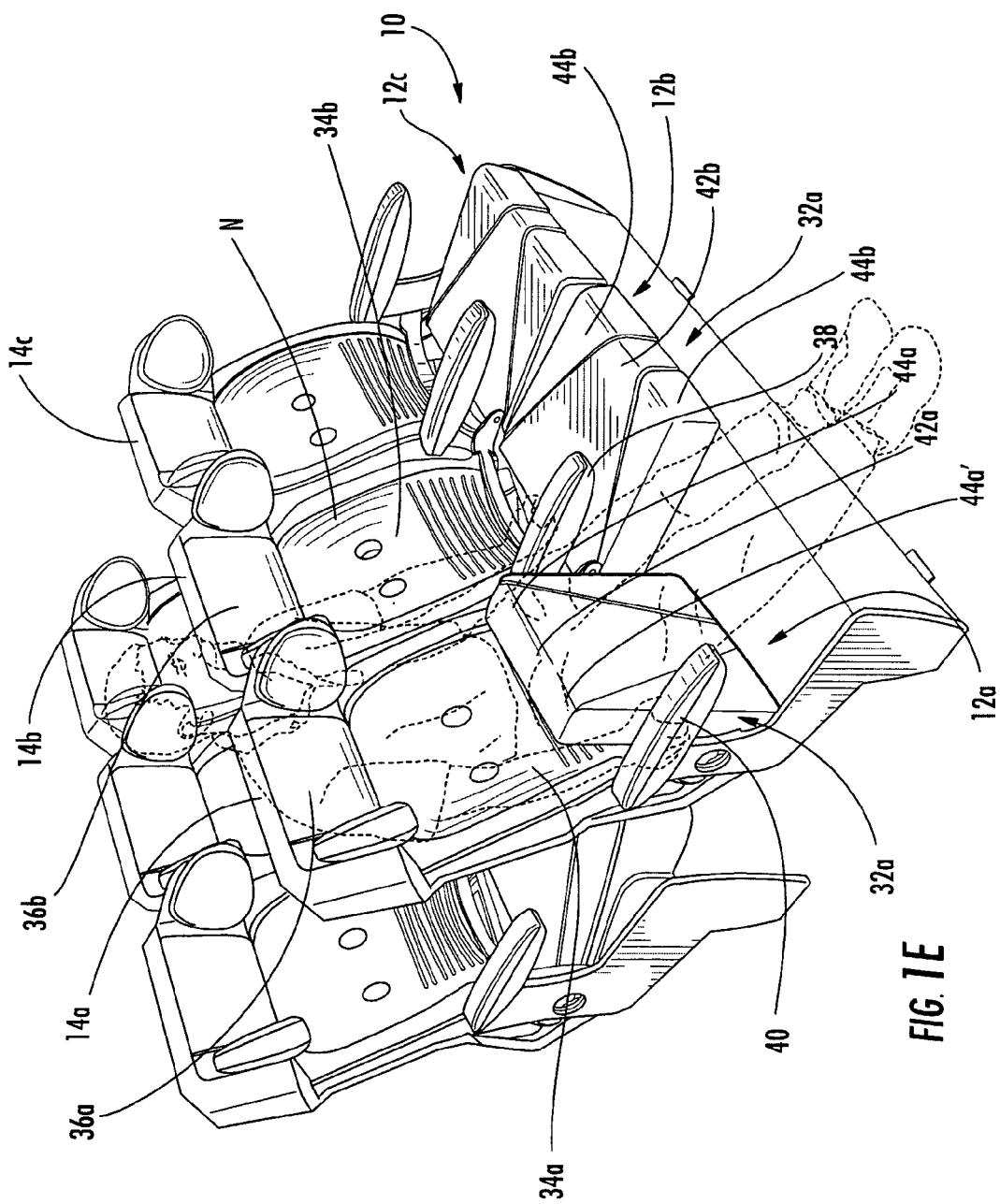
FIG. 1E is a perspective view of the passenger seat set of FIG. 1, with one of seats disposed in a "perch" position.
Figure 2:
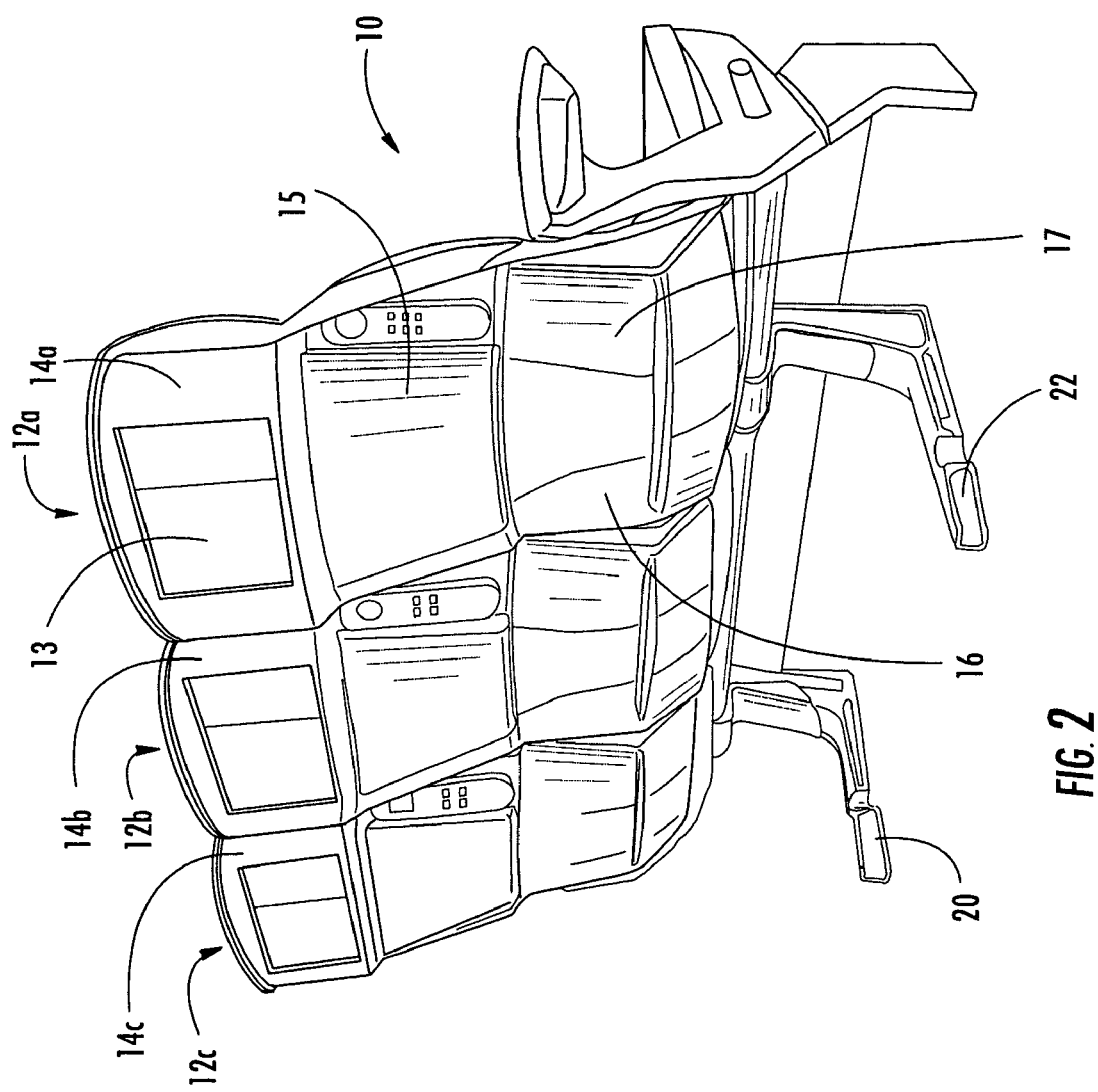
FIG. 2 is rear perspective view of the passenger seat set of FIG. 1.
Figure 3:
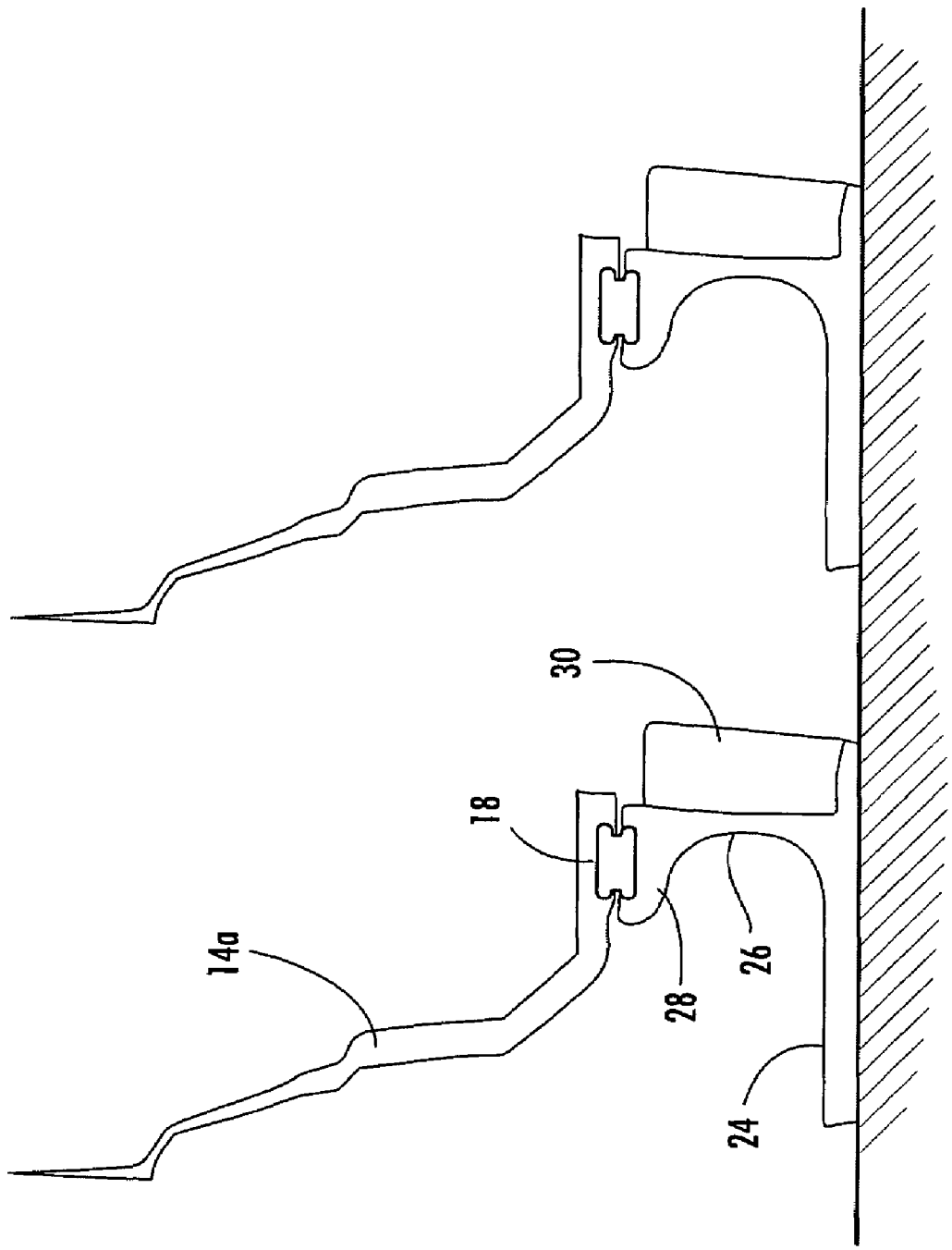
FIG. 3 is a schematic side view of two adjacent seat rows.
Figure 4:
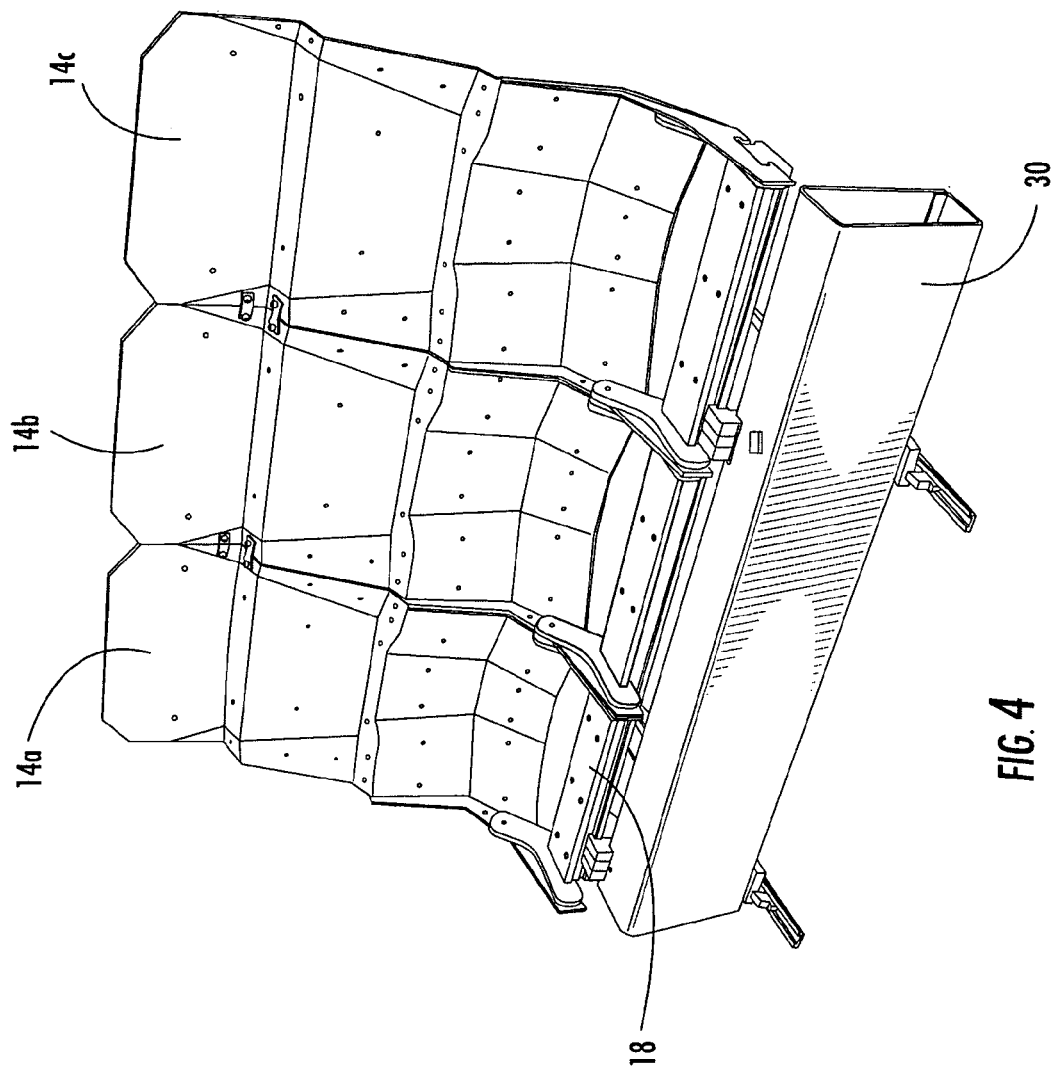
FIG. 4 is a perspective view of a seat frame and attached backshells.

FIG. 1E shows the seat 12*a* configured for a "perching" posture as follows. The seat bottom 12*a* is translated backwards and rotated upwards into a raised position. In the raised position the back edge of the seat bottom 32*a* provides a surface for the passenger to prop against, much the same as sitting on a raised stool. As well as providing an alternative posture, the perch position may be used to facilitate ingress or egress between seat rows by substantially reducing the effective front-to-back length of the seat bottom 32*a*.

Figure 11:
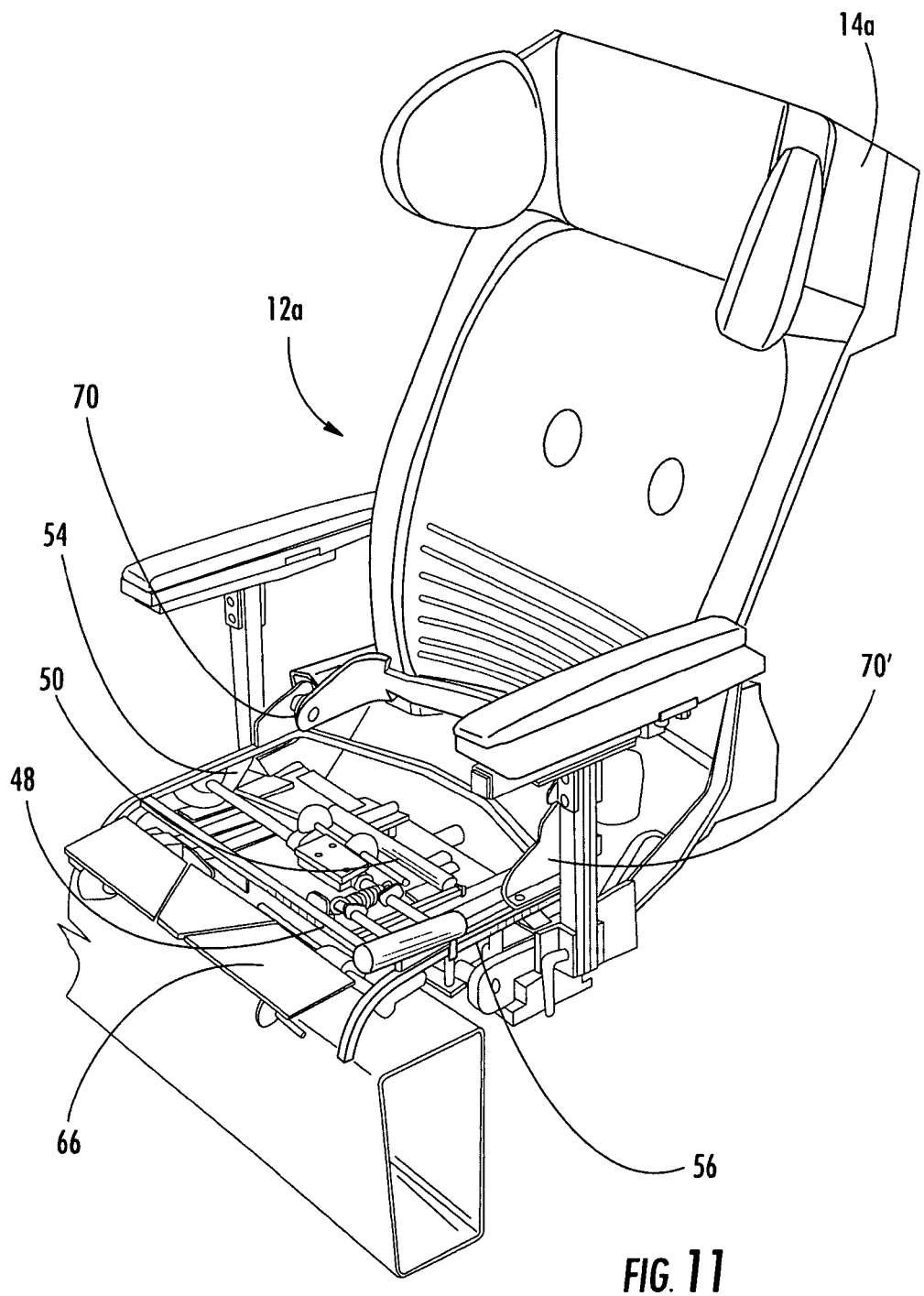
FIG. 11 is a perspective view of a seat.

FIGS. 4–11 illustrate an example of how the internal construction of the seat 12*a* may be arranged. Referring to FIG. 11, The seat 12*a* includes a rigid bottom perimeter frame 48 which is connected to the rigid backshell 14*a* so that it can translate forwards and backwards with respect thereto, for example using slide rail assembly 50. The bottom perimeter frame 48 is covered by a flexible seat pan 52 (removed for clarity in FIG. 11) and a padded bottom cushion (not shown). The bottom perimeter frame 48 is attached to the main beam 18 so that its front end can be selectively raised and lowered to positions above or below horizontal, for example it may be allowed to rock on spaced apart bottom frame pivots 54 and 56.

Figure 5:
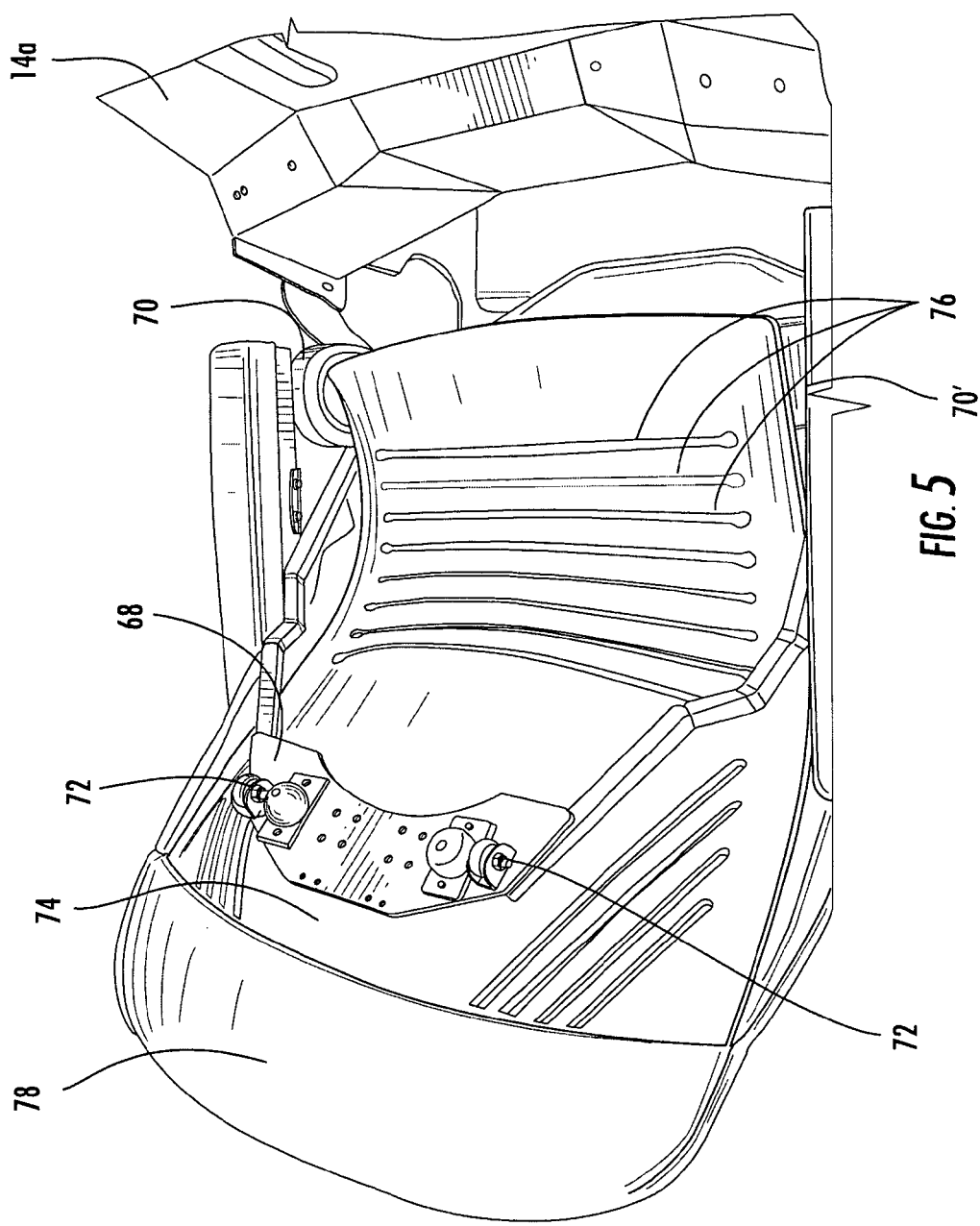
FIG. 5 is a fragmentary perspective view of a seat back and perimeter frame.
Figure 6:
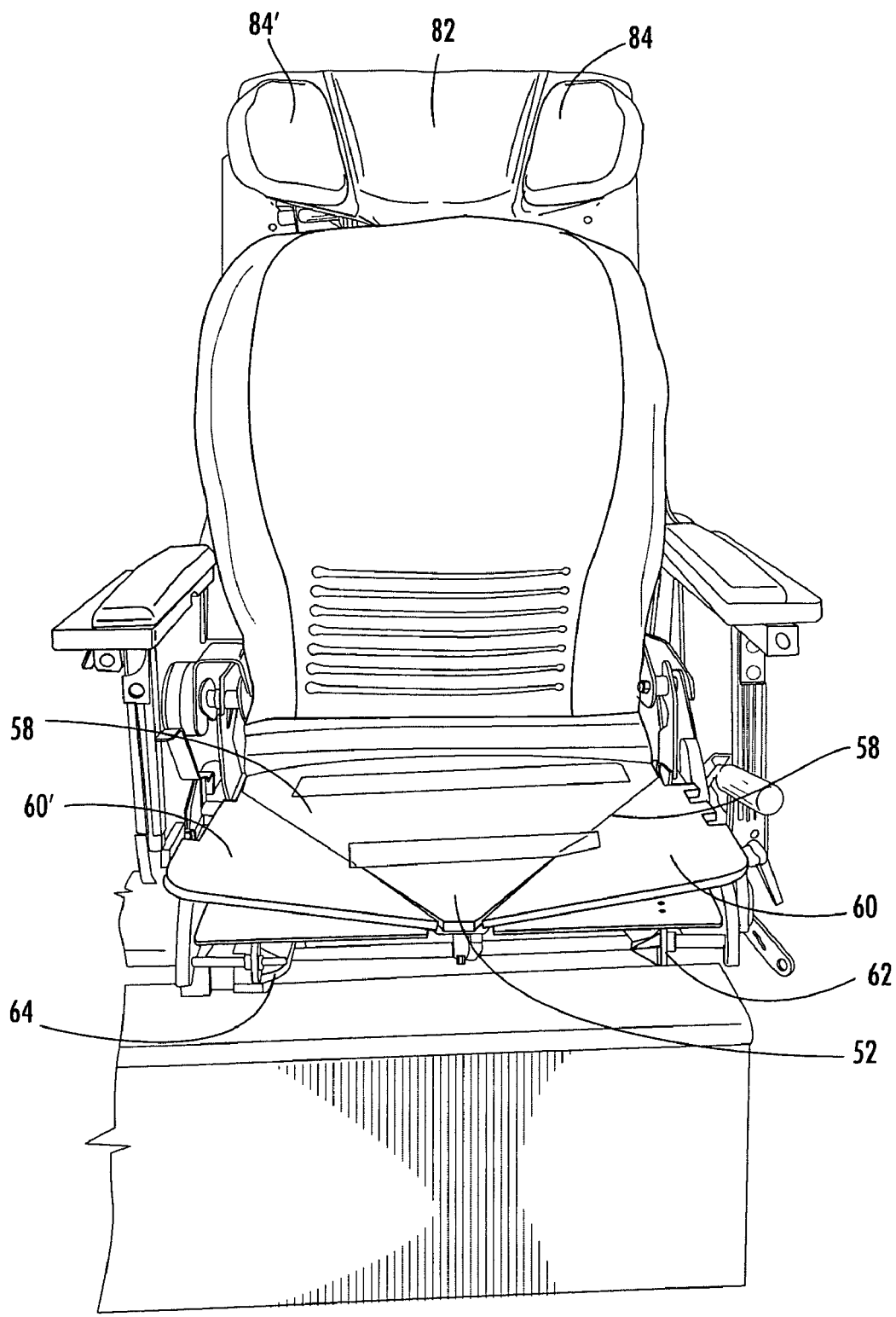
FIG. 6 is front view of a partially disassembled seat, showing the internal construction thereof.
Figure 7:
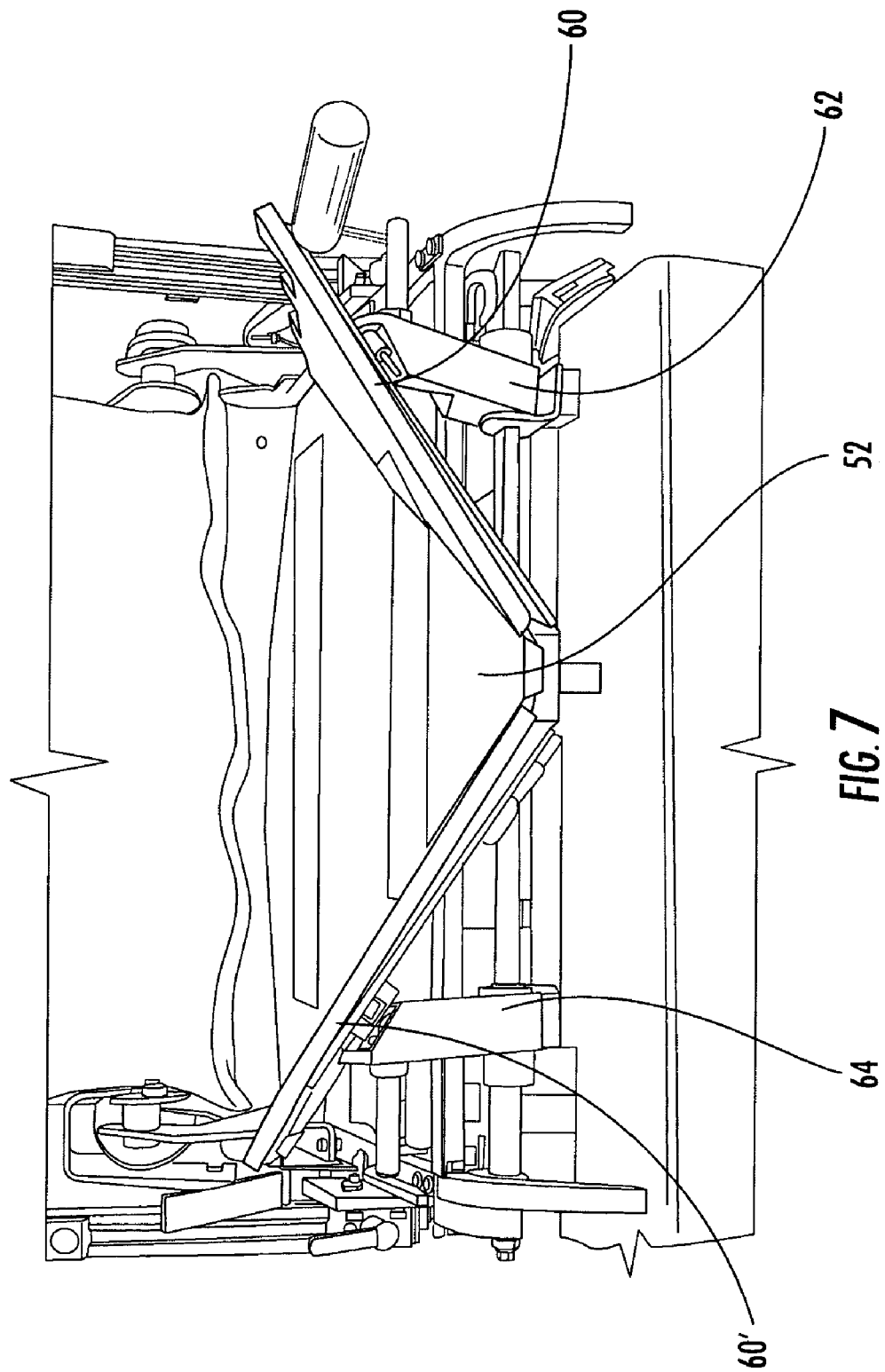
FIG. 7 is front view of a seat bottom having a pivoted support wing.

Referring to FIG. 6, the seat pan 52 includes a pair of angled hinge lines 58 defining a pair of flaps 60 and 60' that form portions of the support wings 44*a* and 44*a'*. Each of the flaps 60 and 60' overlies a left or right support lever 62 or 64, respectively. The support levers 62 and 64 can be individually pivoted to either a lowered position or a raised position (see FIG. 7), and there are provisions for maintaining the support levers 62 and 64 in the selected position. In the raised position, the selected flap 60 or 60' is pivoted upward to support the passenger's hip and thigh as described above. The seat bottom 32*a* may also incorporate a front "waterfall" feature. Specifically, a portion of the front edge of the bottom perimeter frame 48 may be constructed so that it can be selectively folded downwards, thus allowing the seat pan 52 to curl downwards under the passenger's weight and reduce the effective front-to-back length of the seat bottom. In the illustrated example, a hinged lateral support bar 66 (see FIG. 11) is disposed between the support levers 62 and 64 and the front edge of the seat pan 52. Both support levers 62 and 64 may be pivoted downwards simultaneously along with the support bar 66. A rigid back perimeter frame 68 (see FIG. 5) is connected to the bottom perimeter frame 48 at back pivots 70 and 70'. The upper end of the back perimeter frame 68 includes rollers 72 or other suitable structure which bear against the backshell 14a and allow the back perimeter frame 68 to slide up and down with respect thereto. The reclining motion of the seat back 34a is governed by the interaction of the rollers 72 with the backshell 14a as the bottom end of the seat back 34a is pulled forwards or backwards relative to the backshell 14a by the seat bottom 32a The amount of recline (i.e. change in seat back tilt angle) for a given amount of motion of the seat bottom 32a may be thus be selected by appropriate contouring of the surface of the backshell 14a.

A backrest 74 is attached to the back perimeter frame 68. The backrest 74 is a compound-curved member having a plurality of spaced-apart lateral elements 76. The entire backrest 74 is constructed of an appropriate resilient material such as plastic or synthetic rubber. The lateral elements 76 of the backrest 74 can flex individually to separate positions when a passenger sits in the seat 12a. This provides a relatively constant support to the passengers spine while allowing for variance in the exact seating position. The backrest 74 may be enclosed by a dress cover 78 as shown in FIG. 5.

Figure 8:
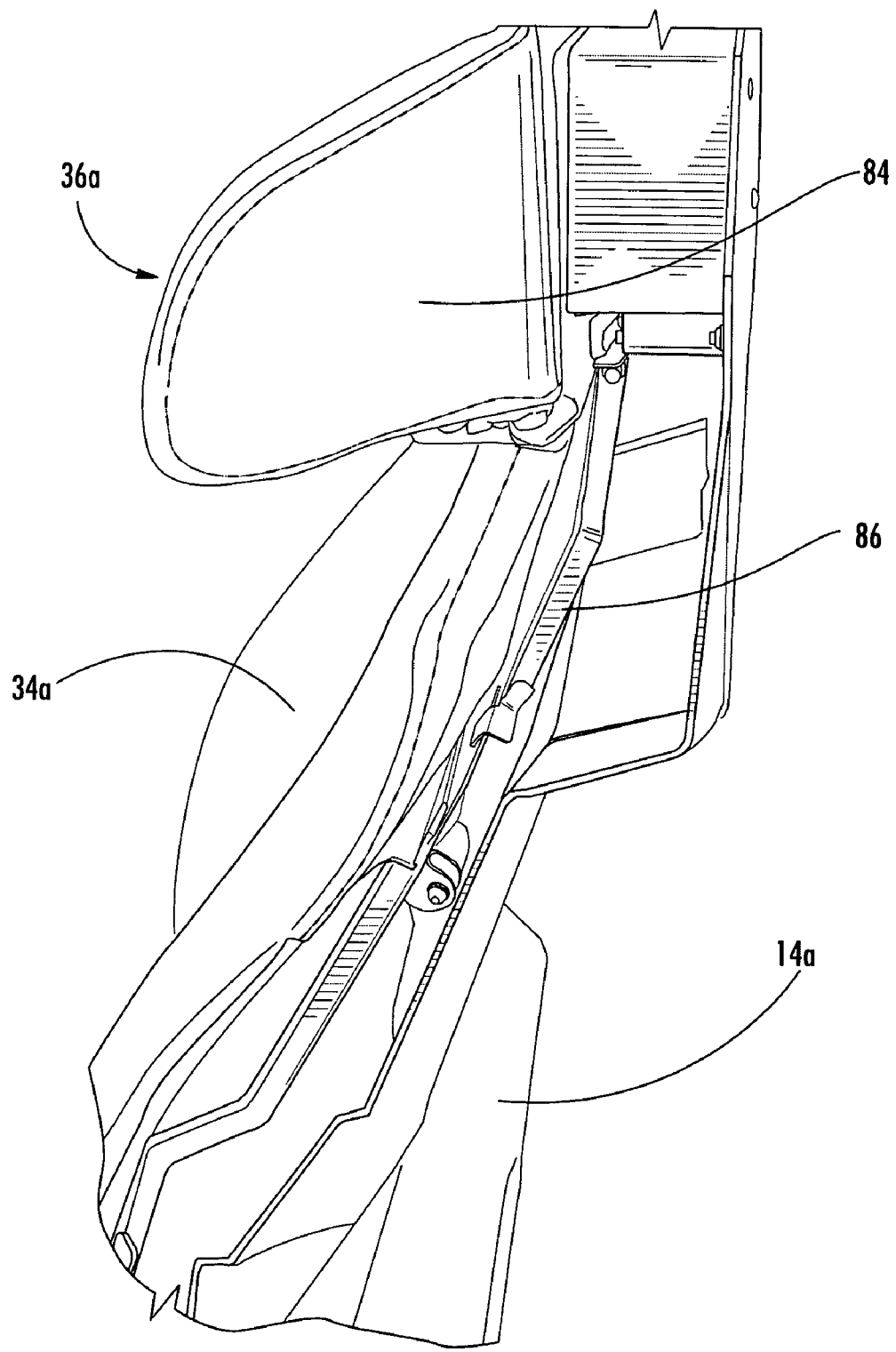
FIG. 8 is a side view of the upper portion of a seat back.

Referring to FIGS. 6, 9 and 10, the headrest 36a is attached to the backshell 14a above the seat back 34a. The headrest 36a comprises a center portion 82 and two forward-angled side portions 84 and 84'. The entire headrest 36a is mounted so that is can rotate about a generally longitudinal axis. It may also be arranged to translate vertically. For example, as shown in FIG. 8, a bar 86 may link the headrest 36a to the seat back 34a. A side pad 88 is mounted on each of the side portions 84 and 84a of the headrest 36a. Each side pad 88 is tapered in thickness and is centrally mounted so that it can both rotate about its center and move laterally relative to the side portion 84 or 84'. Rotation of the tapered side pad 88 has the effect of changing the angle at which it meets the passenger's head, even though the side portion 84 or 84' is not pivoted, and lateral motion of the side pad 88 changes the effective width of the head rest 36a, as shown in FIGS. 9 and 10.

Figure 12:
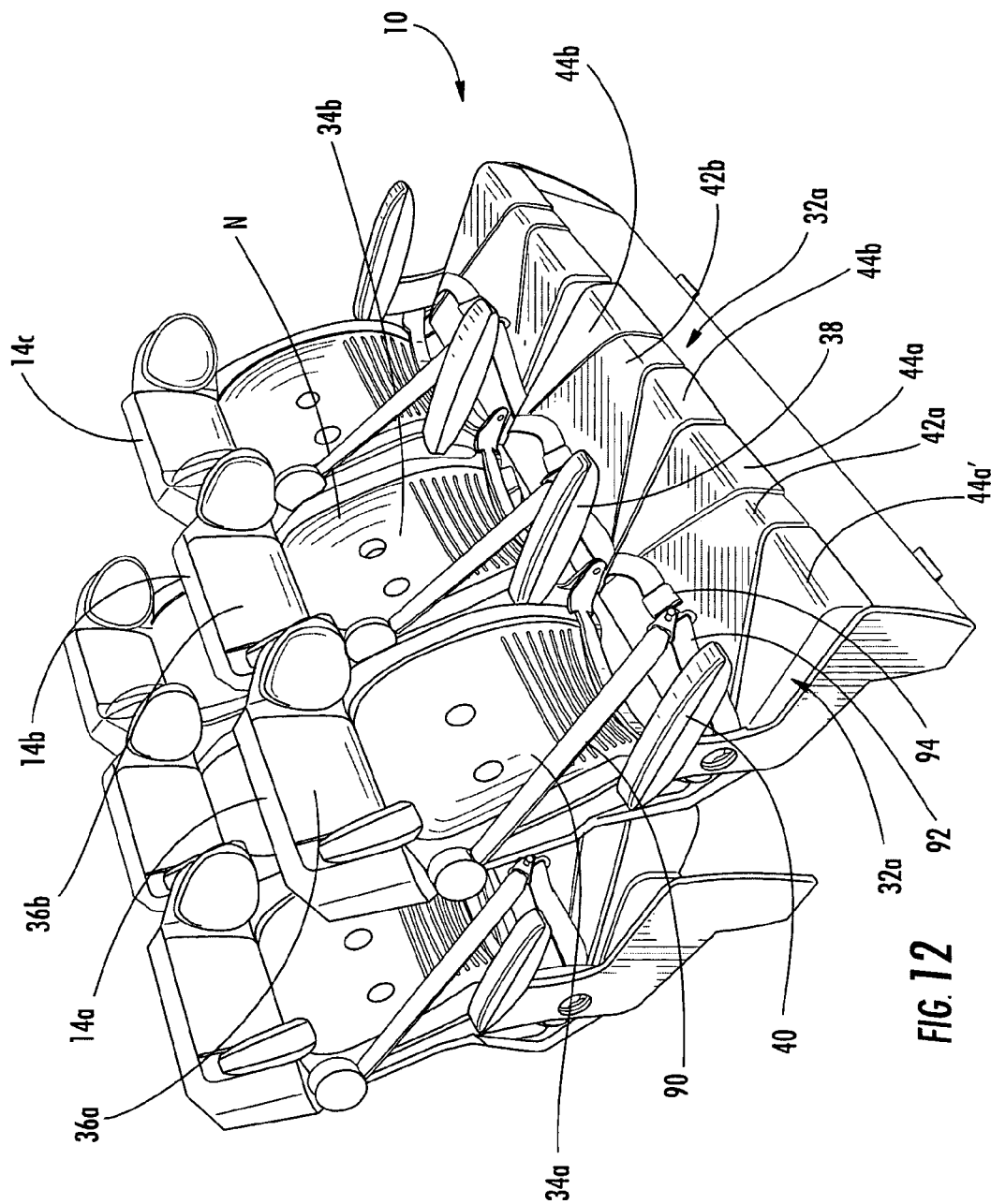
FIG. 12 is a perspective view of a seat incorporating a shoulder harness attached thereto.

FIG. 12 illustrates a seat 12a' which incorporates a shoulder harness 90. The shoulder harness 90 may be connected to a lap belt 92 with a buckle 94 with the shoulder harness 90. The shoulder harness 90 restrains the passenger in his or her own seat 12a during an impact, unlike prior art designs in which the seat forward of the passenger's seat 12a is expected to dissipate the impact of the passenger. Thus, the headpath trajectory of a passenger seated in the seat 12a during an impact is reduced. This allows the front row seat in each zone of an aircraft cabin to be placed closer to the forward bulkhead. This results in increased space in the cabin which can be used to provide addition seat rows or provide addition space (i.e. increased seat pitch) for some or all of the passengers.

The seating arrangement described above has multiple advantages over prior art seating arrangements. By virtue of the fixed backshell 14 with no conventional "aft recline", the last row in each of an aircraft cabin can be placed closer to the rear bulkhead of the zone, increasing the available room in the aircraft cabin.

It should be noted that the fixed living space described herein can be achieved in a number of alternate ways. For example, the backshells 14 may be configured to move, so long at it does not move aft. Alternatively, a backshell may be provided that is fixed for only part of its length, i.e. the upper portion of the backshell 14 may be allowed to recline while the lower part remains fixed.

The foregoing has described a seating arrangement having a features which allow a passenger to assume multiple postures within limited space constraints. These seat features may be combined with each other as desired to produce a seat having multiple comfort features. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. A frame assembly for vehicle passenger seat, comprising:
   (a) at least one leg unit, including a cantilevered transverse main beam carried by a fore and aft-extending seat leg for being mounted to the floor of the vehicle;
   (b) a transversely extending front beam positioned forward of the seat leg;
   (c) a backshell attached to and carried by the transverse main beam, wherein the backshell is structurally connected to the leg unit solely through the main beanm;
   (d) a seat back carried on the backshell; and
   (e) a seat bottom carried by a perimeter frame mounted on the backshell.

2. A frame assembly according to claim 1, wherein the front beam comprises a hollow box beam extending substantially from floor level to a position adjacent the seat bottom.

3. A frame assembly according to claim 2, wherein the box beam is adapted to contain electrical and electronic seat components.

4. A frame assembly according to claim 1, wherein the perimeter frame comprises a back frame and a bottom frame carried by the backshell.

5. A frame assembly according to claim 4, wherein the bottom frame is covered by a flexible seat pan and a padded seat cushion.

6. A frame assembly according to claim 5, wherein the perimeter frame is mounted on the backshell for fore and aft sliding motion.

7. A frame assembly according to claim 1, wherein the frame assembly comprises two laterally spaced-apart leg units, and further wherein the cantilevered transverse main beam connects and maintains the two leg units in a fixed relationship with each other.

8. A frame assembly according to claim 7, wherein the frame assembly comprises
   (a) a transversely extending front beam positioned forward of the seat leg;
   (b) at least first and second side-by-side backshells attached to and carried by the transverse main beam;
   (c) first and second perimeter frames carried by respective backshells; and
   (d) first and second seat bottoms carried by respective perimeter frames.

9. A frame assembly according to claim 1, wherein the backshell comprises contoured clearance areas to provide room for the knees of an aft-seated passenger.

10. A frame assembly according to claim 1, wherein the backshell comprises a rigid material fixed to the transverse main beam for maintaining a stationary position during movement of the seat back and seat bottom to a plurality of comfort positions in order not to encroach on space occupied by an aft-seated passenger.

11. A frame assembly according to claim 10, wherein the backshell comprises a plurality of generally planar facets angled to collectively define a shape adapted for serving as a seat back.

12. A frame assembly according to claim 10, wherein the seat back is mounted for movement relative to the backshell between upright and reclined positions.

13. A frame assembly according to claim 1, wherein the backshell is mounted for a limited, passenger-initiated back-and-forth rocking motion.

14. A frame assembly for vehicle passenger seat, comprising:
   (a) at least one leg unit, including a cantilevered transverse main beam carried by a fore and aft-extending seat leg for being mounted to the floor of the vehicle;
   (b) a transversely extending front beam positioned forward of the seat leg, the front beam comprising a hollow, transversely-extending box beam;
   (c) a backshell attached to and carried by the transverse main beam wherein the backshell is structurally connected to the leg unit solely through the main beam;
   (d) a seat back carried on the backshell;
   (e) a seat bottom carried by a perimeter frame comprising a back frame and a bottom frame carried by the backshell; and
   (f) the bottom frame being covered by a flexible seat pan and a padded seat cushion.

15. A frame assembly according to claim 14, wherein the box beam is adapted to contain electrical and electronic seat components.

16. A frame assembly according to claim 14, wherein the frame assembly comprises two laterally spaced-apart leg units, and further wherein the cantilevered transverse main beam connects and maintains the two leg units in a fixed relationship with each other.

17. A frame assembly according to claim 14, wherein the backshell comprises contoured clearance areas to provide room for the knees of an aft-seated passenger.

18. A frame assembly according to claim 14, wherein the backshell comprises a rigid material fixed to the transverse main beam for maintaining a stationary position during movement of the seat back and seat bottom to a plurality of comfort positions in order not to encroach on space occupied by an aft-seated passenger.

19. A frame assembly according to claim 14, wherein the backshell comprises a plurality of generally planar facets angled to collectively define a shape adapted for serving as a seat back.

20. A frame assembly according to claim 14, wherein the seat back is mounted for movement relative to the backshell between upright and reclined positions.

21. A frame assembly according to claim 14, wherein the backshell is mounted for a limited, passenger-initiated back-and-forth rocking motion.

22. A frame assembly according to claim 21, wherein the perimeter frame is mounted on the backshell for fore and aft sliding motion.

* * * * *

UNITED STATES PATENT AND TRADEMARK OFFICE
CERTIFICATE OF CORRECTION

PATENT NO. : 7,134,729 B2 Page 1 of 1
APPLICATION NO. : 10/979680
DATED : November 14, 2006
INVENTOR(S) : Dowty et al.

It is certified that error appears in the above-identified patent and that said Letters Patent is hereby corrected as shown below:

Column 8, line 27, delete "beanm" and insert the word --beam--.

Signed and Sealed this

Second Day of January, 2007

JON W. DUDAS
*Director of the United States Patent and Trademark Office*